Jan. 24, 1967   J. M. LIND   3,299,837
DOUGH SHEETER
Filed Nov. 27, 1963   2 Sheets-Sheet 1
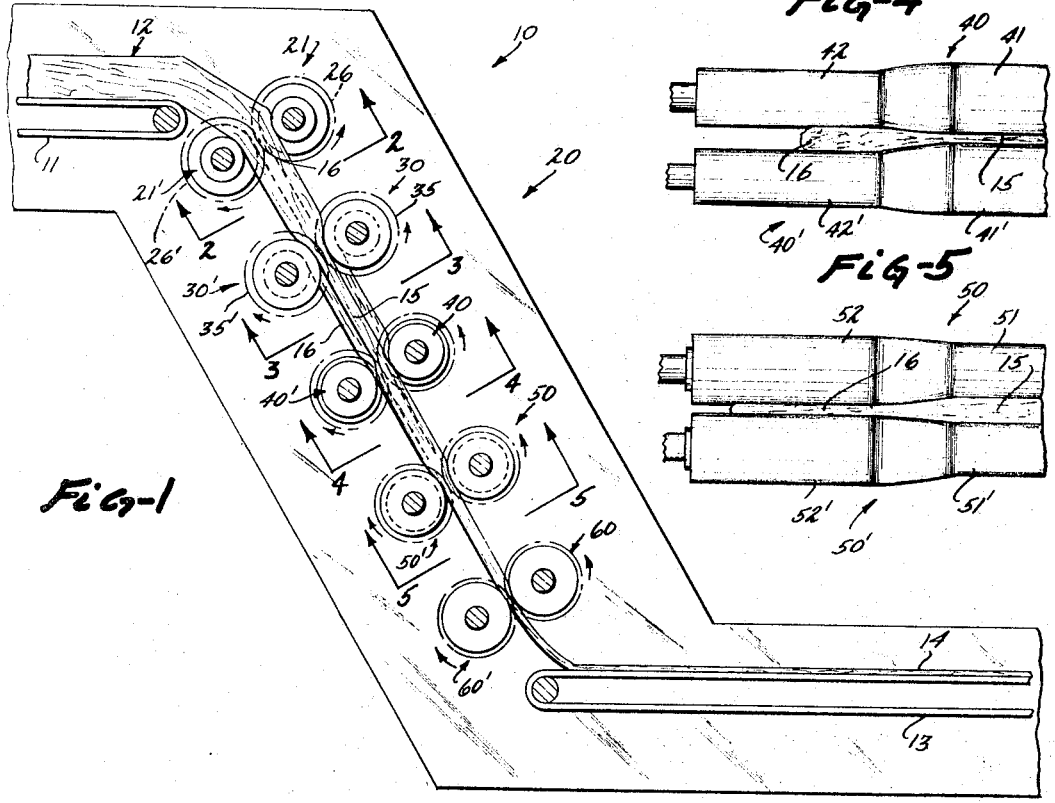
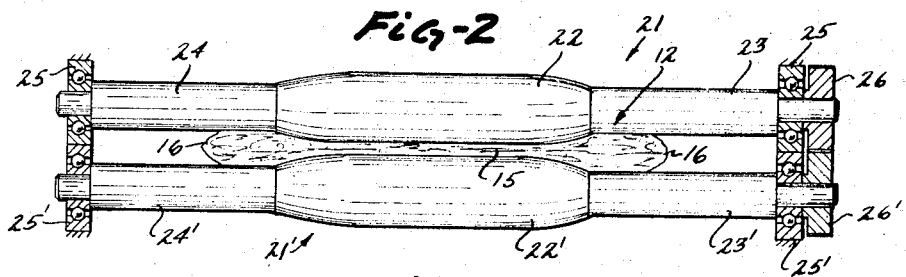
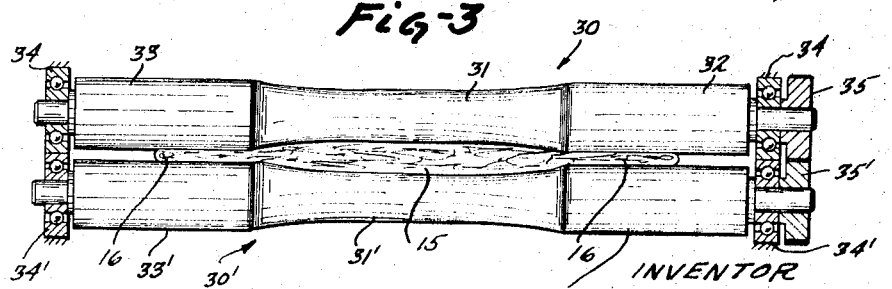
INVENTOR
JOSEPH M. LIND
BY Herzig & Walsh
ATTORNEYS Jan. 24, 1967 J. M. LIND 3,299,837
DOUGH SHEETER
Filed Nov. 27, 1963 2 Sheets-Sheet 2
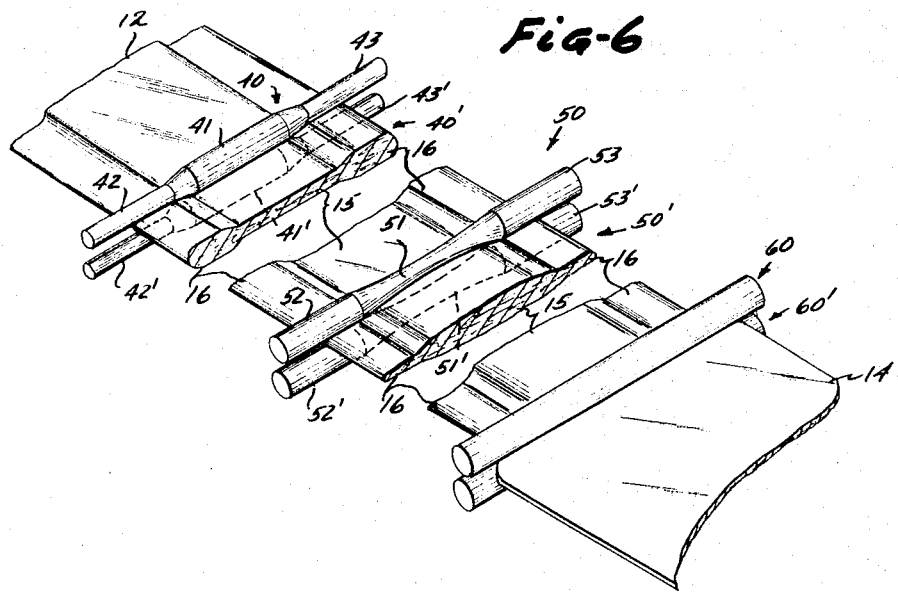
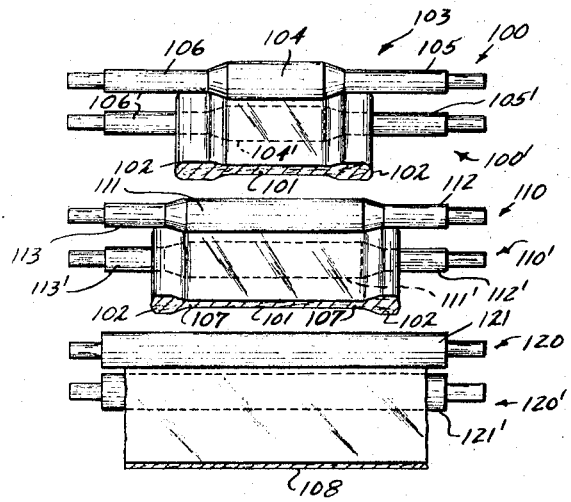
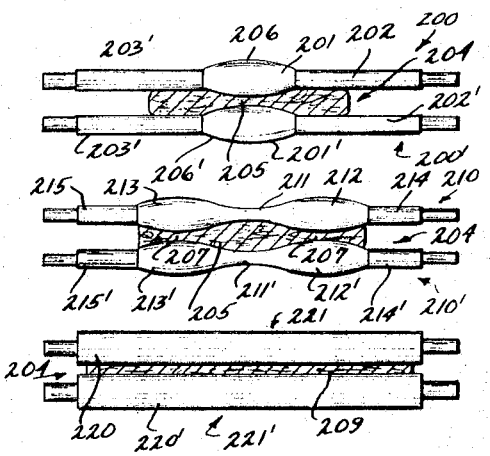
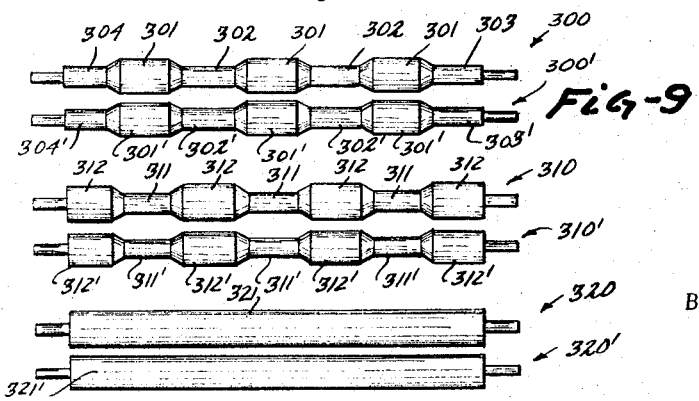
INVENTOR.
JOSEPH M. LIND
BY
Herzig & Walsh
ATTORNEYS

United States Patent Office 3,299,837
Patented Jan. 24, 1967

3,299,837
DOUGH SHEETER
Joseph M. Lind, 400 N. Sycamore St.,
Los Angeles, Calif. 90036
Filed Nov. 27, 1963, Ser. No. 326,542
8 Claims. (Cl. 107—12)

In general, the present invention relates to a dough sheeter apparatus and more particularly to the rolling portion of the dough sheeter apparatus. More specifically, the present invention relates to a dough sheeter adapted to concurrently reduce to a uniform thickness a mass of dough and extend it longitudinally and laterally without setting up substantial internal stresses.

In commercial baking, it has been the common practice for many years to form continuous sheets of dough from a batch, piece or mass of dough. See, for example, Loose, Patent No. 1,134,971 issued April 6, 1915 and Doering, U.S. Patent No. 2,965,050 issued December 20, 1960. However, as noted by Loose, where the rolling forms a continuous sheet of dough by compression, certain doughs after compression contract and other doughs continue to flow with the particular characteristics dependent generally upon the amount of sugar among other things. Such expansion or contraction is generally called self-readjustment and constitutes a major problem in achieving uniform dough thickness after it has passed through the dough sheeter. Thus, if one merely rolls the dough through a pair of uniform rolls or a series of such pairs of rolls, after such rolling operation, most doughs have a tendency to expand or contract so that the resulting product is not the uniform thickness formed by such rolls. Furthermore, in such uniform rolling operation, the dough is substantially only elongated and thinned down with only a nominal amount of widening of the dough mass resulting. In addition, the usual dough stripping operation by uniform rolling creates substantial internal stresses in the dough sheet being formed so that subsequent handling of the dough is complicated. One proposed solution to such problem has been suggested by Stiles, U.S. Patent No. 2,735,379 issued February 21, 1956 wherein the internal stresses were sought to be relieved by a separate operation by passing the dough over two rollers which tend to stretch and then to bunch it somewhat. Subsequently, the strip of dough is rolled transversely by an additional roller to increase its width. However, such additional operation complicates the dough sheeting process and the transverse rolling of the strip of dough tends to set up additional internal stresses which have been only partially relaxed previously.

Consequently, an object of the present invention is a dough sheeter adapted to continuously concurrently reduce to a uniform thickness a mass of dough and extend it longitudinally and laterally.

Another object of the present invention is a dough sheeter which is adapted to expand a mass of dough longitudinally and laterally without setting up substantial internal stresses.

Still another object of the present invention is a dough sheeter which is adapted to concurrently reduce to a uniform thickness a mass of dough, and extended longitudinally and laterally without setting up substantial internal stresses by utilizing a series of pairs of rolls which can be simply adapted to conventional sheeting equipment.

Other objects and advantages of the present invention will be readily apparent from the following description and drawings which illustrate a preferred exemplary embodiment of the present invention as well as alternate embodiments of the present invention.

In general, the present invention involves a dough sheeter comprising a first pair of rolls adapted to squeeze at least a first longitudinal strip portion of a mass of dough and a second pair of rolls adapted to squeeze additional longitudinal strip portions of said dough mass symmetrically located with respect to the first longitudinal strip portion.

In order to facilitate understanding of the present invention, reference will now be made to the appended drawings of a preferred specific embodiment of the present invention. Such drawings should not be construed as limiting the invention which is properly set forth in the appended claims.

In the drawings:

FIGURE 1 is a side view of the present invention showing the rolls portion of a dough sheeter.

FIGURE 2 is a cross-sectional view of FIGURE 1 taken along the line 2—2 of FIGURE 1.

FIGURE 3 is a cross-sectional view of FIGURE 1 taken along the line 3—3 of FIGURE 1.

FIGURE 4 is a partial cross-sectional view of FIGURE 1 taken along the lines of 4—4 of FIGURE 1.

FIGURE 5 is a partial cross-sectional view of FIGURE 1 taken along the lines 5—5 of FIGURE 1.

FIGURE 6 is a perspective view of a portion of FIGURE 1 showing several of the rolls in sequence.

FIGURE 7 is a semi-perspective view of another embodiment of the present invention showing a sequence of rolls.

FIGURE 8 is a semi-perspective view of another embodiment of the present invention showing a sequence of rolls.

FIGURE 9 is a semi-perspective view of still another embodiment of the present invention showing a sequence of rolls.

As illustrated in FIGS. 1–6, the present invention involves a dough sheeter 10 including a feeding conveyor 11 for feeding a mass of dough 12 to the rolling means 20 of the dough sheeter 10 and a receiving conveyor 13 for receiving the sheet of dough 14 from the rolling means 20 and carrying it to the next operation. The rolling means 20 includes a first pair of rolls 21 and 21' which initially receive the dough mass 12 from the feeding conveyor 11 and are adapted to squeeze at least a first longitudinal strip portion 15 of the mass of dough 12. As illustrated, the first pair of rolls 21 and 21' squeezes a central strip portion 15 by means of enlarged uniform diameter central portion 22 and 22' with reduced uniform diameter end portions 23 and 23' and 24 and 24'. The rolls 21 and 21' are mounted on conventional bearings 25 and 25' and driven by conventional gears 26 and 26'.

Following the first pair of rolls 21 and 21' is a second pair of rolls 30 and 30' which receives the mass of dough 12 from the first pair of rolls 21 and 21'. The second pair of rolls 30 and 30' are adapted to squeeze additional longitudinal strip portions of the dough mass 12 symmetrically located with respect to the first longitudinal strip portions 15. More particularly, a second pair of rolls 30 and 30' are adapted to relax the compression on the first longitudinal strip portion 15 while squeezing additional longitudinal strip portions 16. As illustrated, the second pair of rolls 30 and 30' squeeze the strip portions 16 adjoining and on both sides of the central strip portion 15 without exerting substantial compression on the central strip portion 15 by having reduced uniform diameter central portions 31 and 31' with enlarged uniform diameter end portions 32 and 32' and 33 and 33' respectively. Similar to the first pair of rolls 21 and 21', the second pair of rolls 30 and 30' are mounted on conventional bearings 34 and 34' respectively and driven by conventional gears 35 and 35' respectively.

Receiving the mass of dough 12 from the second pair of rolls 30 and 30' is a third pair of rolls 40 and 40' which are substantially similar to the first pair of rolls 21 and 21' respectively. Thus, the third pair of rolls 40 and 40' have enlarged uniform diameter central portions 41 and 41' and reduced uniform diameter end portions 42 and 42' and 43 and 43' respectively. Thus, the third pair of rolls 40 and 40' squeeze the central strip portion 15 of the dough mass 12 while substantially relaxing the compression on the adjoining strip portions 16.

Receiving the dough mass 12 from the third pair of rolls 40 and 40' is a fourth pair of rolls 50 and 50' which are substantially similar to the second pair of rolls 30 and 30'. Thus, the fourth pair of rolls 50 and 50' have reduced uniform diameter central portions 51 and 51' and enlarged uniform diameter end portions 52 and 52' and 53 and 53' respectively. In this way, the fourth pair of rolls 50 and 50' relaxes the compression on the central longitudinal strip portion 15 while squeezing the adjoining longitudinal strip portion 16.

A fifth pair of rolls 60 and 60' receives the previously rolled dough mass 12 from the fourth pair of rollers 50 and 50' and have a uniform diameter adapted to squeeze the entire dough mass equally to form a dough sheet 14 having a constant thickness.

As can be seen from the foregoing description of the dough sheeter 10, during operation, the mass of dough 12 is compressed in a central strip portion while substantially relaxing any compression on edge strip portions, and then the edge strip portions are squeezed while the compression on the central strip portion is substantially relaxed. The operation is then repeated and the clearance between the successive rolls can be made smaller than the preceding two rolls, if desired. Such arrangement reduces the thickness of the dough mass continuously and concurrently extends it both longitudinally and laterally. In addition, because of the alternating compression and relaxation, the internal stresses in the dough mass are substantially eliminated.

Another embodiment is illustrated in FIG. 7, where a first set of rolls 100 and 100' squeeze a central strip portion 101 without substantially compressing edge strip portions 102 of a mass of dough 103 by means of enlarged uniform diameter central portions 104 and 104' respectively. The reduced uniform diameter end portions 105 and 105' and 106 and 106' respectively do not exert substantial compression on the edge strip portions 102 during the rolling of the central strip portion 101 by the central portions 104 and 104' of the rolls 100 and 100'. A second pair of rolls 110 and 110' receives the mass of dough 103 of the first pair of rolls 100 and 100'. The second pair of rolls 110 and 110' have a longer enlarged uniform diameter central portions 111 and 111' and correspondingly shorter end portions 112 and 112' and 113 and 113' respectively. Thus, the second pair of rolls 110 and 110' continue to squeeze the first longitudinal strip portion 101 while squeezing additional longitudinal strip portions 107. However, the edge strip portions 102 continue to remain substantially relaxed from compression. Finally, a third pair of rolls 120 and 120' having a uniform diameter throughout the rolling portions 121 and 121' receives the dough mass 101 from the second pair of rolls and forms a constant thickness sheet 108. The arrangement of dough sheeter rolls shown in FIG. 7 achieves continuous reduction in thickness of a mass of dough to a uniform thickness while concurrently longitudinally and laterally extending it. However, although some reduction in the amount of internal stresses is achieved, such arrangement does not achieve the exceptional result of the rolls illustrated in FIGS. 1–6 wherein no substantial internal stresses are set up.

As shown in FIGURE 8, a first pair of rolls 200 and 200' have an enlarged central portions 201 and 201' respectively with reduced end portion 202 and 202' and 203 and 203' respectively for rolling a mass of dough 204 by squeezing a central strip portion 205. However, the enlarged central portions 201 and 201' are formed from curved surfaces 206 and 206'. A second pair of rolls 210 and 210' each have a reduced central portion 211 and 211' with symmetrical adjoining enlarged portions 212 and 212' and 213 and 213' respectively and finally reduced end portions 214 and 214' and 215 and 215' respectively. The second pair of rolls 210 and 210' receive the dough mass 204 and relax the compression on the first central longitudinal strip portion 205 while squeezing strip portions 207 adjoining the central strip portion 205. Finally, a third pair of rolls 220 and 220' having uniform rolling diameter 221 and 221' to receive the dough mass 204 from the second pair of rolls and form a sheet 209. The dough sheeter illustrated in FIG. 8 achieves the similar result to that achieved by the dough sheeter illustrated in FIGS. 1–6; however, the dough sheeter in FIG. 8 sets up even less internal stresses since the transition between strips of compression and strips of relaxation is smooth and gradual. However, the rolls illustrated in FIG. 8 are much more expensive to manufacture so that the improved results achieved may not justify such expense for many commercial operations.

As illustrated in FIG. 9, the dough sheeter involves a first pair of rolls 300 and 300' having a first series of substantially equally spaced enlarged portions 301 and 301' separated by a second series of substantially equally spaced reduced portions 302 and 302' along with reduced end portion 303 and 303' and 304 and 304'. Following the first pair of rolls 300 and 300' is a second pair of rolls 310 and 310' having a first series of substantially equally spaced reduced portions 311 and 311' corresponding to the enlarged portions 301 and 301' on the first pair of rolls 300 and 300'. Separating said reduced portions 311 and 311' is a second series of equally spaced enlarged portions corresponding to the reduced portions 312 and 312' corresponding to the reduced portions 302 and 302' of the first pair of rolls 300 and 300'. With such arrangement, the first pair of rolls 300 and 300' squeezes a first series of substantially equally spaced strip portions and the second pair of rolls 310 and 310' squeezes a second series of substantially equally spaced strip portions separated by and adjoining the first set of strip portion of a dough mass. Finally, a third set of rolls 320 and 320' follows the second pair of rolls 310 and 310' and have uniform diameters 321 and 321' for forming a sheet of dough. The dough sheeter illustrated in FIG. 9 achieves similar result to the dough sheeter illustrated in FIGS. 1–6 with some additional favorable results. Not only is the extension laterally achieved more rapidly, but also the various portions of the dough mass are worked much more thoroughly so that even less internal stress is set up within the dough mass.

Many other specific embodiments of the present invention will be obvious to one skilled in the art in view of this disclosure such as those illustrated in FIGS. 7–9. In addition, the number of pairs of rolls may vary from as few as three pairs as in FIG. 7 to five or more rolls, depending upon the number of rolls required to achieve the desired lateral extension. Also, although both cylindrical and curved surfaces are illustrated for the various enlarged and reduced portions of the rolls, a combination of such surfaces may be used on any one roll or on succeeding pairs of rolls.

There are many features in the present invention which clearly show the significant advance the present invention represents over the prior art. Consequently, only a few of the more outstanding features will be pointed out to illustrate the unexpected and unusual results attained by the present invention. One feature of the present invention is the fact that the rolls of the present invention are capable of reducing a mass of dough to a uniform thickness which exhibits substantially no self-readjustment due to the working of the dough in reducing it to the uniform thickness. Another feature of the present invention is the continuous concurrent reduction in the thickness of the mass of dough with the extension of the mass both longitudinally and laterally. Thus, while dough sheeters of the prior art required separate sets of rolls to achieve both longitudinal and lateral extension, the present invention achieves the same effect with a single set of rolls. Another feature of the present invention is the reduction of a mass of dough to a sheet without setting up substantial internal stresses because of the compression and relaxation of the dough during the sheeting process. Still another feature of the present invention is the utilization of roll which can be conveniently used on conventional existing dough sheeters without extensive alterations thereof.

It will be understood that the foregoing description and examples are only illustrative of the present invention and it is not intended that the invention be limited thereto. All substitutions, alterations and modifications of the present invention which come within the scope of the following claims or to which the present invention is readily susceptible without departing from the spirit and scope of this disclosure, are considered part of the present invention.

What is claimed is:

1. A dough sheeter adapted to extend a mass of dough longitudinally and laterally without setting up substantial internal stresses comprising:
   (a) a first pair of rolls having a nip formed by at least one enlarged diameter portion on each roll, said enlarged diameter portions being opposed, and at least one reduced diameter portion on each roll, said reduced diameter portions being opposed, for squeezing at least a first longitudinal strip portion of said mass of dough; and
   (b) a second pair of rolls aligned with and immediately following said first pair of rolls for receiving said dough mass therefrom, said second pair of rolls having a nip formed by at least one enlarged diameter portion on each roll aligned with said reduced diameter portions on said first pair of rolls and at least one reduced diameter portion on each roll aligned with said enlarged diameter portions on said first pair of rolls for squeezing at least one additional longitudinal strip portion of said dough mass symmetrically located with respect to said first longitudinal strip portion.

2. A dough sheeter adapted to continuously concurrently reduce to a uniform thickness a mass of dough and extend it longitudinally and laterally without setting up substantial internal stresses comprising:
   (a) a first pair of rolls having a nip formed by at least one enlarged diameter portion on each roll, said enlarged diameter portions being opposed and at least one reduced diameter portion on each roll, said reduced diameter portions being opposed, for squeezing at least a first longitudinal strip portion of said mass of dough;
   (b) a second pair of rolls aligned with and immediately following said first pair of rolls for receiving said dough mass therefrom, said second pair of rolls having a nip formed by at least one enlarged diameter portion on each roll aligned with said reduced diameter portions on said first pair of rolls and at least one reduced diameter portion on each roll aligned with said enlarged diameter portions on said first pair of rolls for squeezing at least one additional longitudinal strip portion of said dough mass symmetrically located with respect to said first longitudinal strip portion; and
   (c) a third pair of rolls aligned with and immediately following said second pair of rolls for receiving said dough mass therefrom, said third pair of rolls having a nip of uniform width to uniformly squeeze the entire dough mass.

3. A dough sheeter as stated in claim 2 wherein the portion of the nip formed by said reduced portions of said second pair of rolls is sufficiently narrow to continue to squeeze the first longitudinal strip portion while the portion of the nip formed by said enlarged portions of said second pair of rolls squeezes said additional longitudinal strip portion.

4. A dough sheeter as stated in claim 2 wherein the portion of the nip formed by said reduced portions of said second pair of rolls is wide enough to relax the compression on the first longitudinal strip portion while the portions of the nip formed by said enlarged portion squeezes said additional longitudinal strip portion.

5. A dough sheeter as stated in claim 2 wherein said nip on said first pair of rolls is formed by a plurality of enlarged, centrally-located portions on each roll for squeezing a first series of substantially equally spaced strip portions and said nip on said second pair of rolls is formed by a plurality of enlarged portions on each end of each of said second pair of rolls for squeezing a second series of substantially equally spaced strip portions separated by and adjoining said first series of strip portions.

6. A dough sheeter as stated in claim 2 wherein said nip on said first pair of rolls is formed by an enlarged central portion and reduced end portions on each roll and wherein said nip on said second pair of rolls is formed by a reduced central portion and enlarged end portions on each roll.

7. A dough sheeter as stated in claim 6 wherein each of said roll portions is substantially cylindrical.

8. A dough sheeter as stated in claim 6 wherein each of said roll portions is a smooth curve in longitudinal cross section.

References Cited by the Examiner

UNITED STATES PATENTS

| | | | |
|---|---|---|---|
| 319,991 | 6/1885 | Morhard | 107—12 |
| 2,276,545 | 3/1942 | Olgiati | 107—12 X |
| 2,822,575 | 2/1958 | Imbert et al. | 18—10 X |
| 3,055,318 | 9/1962 | Engels | 107—12 |

FOREIGN PATENTS

| | | |
|---|---|---|
| 275,839 | 6/1914 | Germany. |
| 268,857 | 10/1929 | Italy. |

WALTER A. SCHEEL, *Primary Examiner.*